US012633664B2

(12) United States Patent

Verd et al.

(10) Patent No.: US 12,633,664 B2

(45) Date of Patent: May 19, 2026

(54) TUNABLE ANTENNA

(71) Applicant: Naval Information Warfare Center Pacific, San Diego, CA (US)

(72) Inventors: Frederick J. Verd, Santee, CA (US); Justin Church, San Diego, CA (US); Alejandro T. Castro, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 115 days.

(21) Appl. No.: 18/921,600

(22) Filed: Oct. 21, 2024

(65) Prior Publication Data

US 2026/0100510 A1 Apr. 9, 2026

Related U.S. Application Data

(62) Division of application No. 18/315,838, filed on May 11, 2023, now Pat. No. 12,199,356.

(51) Int. Cl.
*H01Q 5/40* (2015.01)
*H01Q 5/392* (2015.01)

(52) U.S. Cl.
CPC ............... *H01Q 5/40* (2015.01); *H01Q 5/392* (2015.01)

(58) Field of Classification Search
CPC .......... H01Q 1/247; H01Q 1/28; H01Q 1/288; H01Q 5/392; H01Q 5/40; H01Q 3/2694; H01Q 3/36; H01Q 21/24; H01Q 21/28; H01Q 7/00; H01Q 7/005
See application file for complete search history.

(56) References Cited

U.S. PATENT DOCUMENTS

| | | | | | |
|---|---|---|---|---|---|
| 5,592,182 | A * | 1/1997 | Yao | H01Q 21/26 | 343/742 |
| 5,784,032 | A * | 7/1998 | Johnston | H01Q 7/00 | 343/702 |
| 6,542,128 | B1 * | 4/2003 | Johnson | H01Q 9/28 | 343/826 |
| 6,618,016 | B1 * | 9/2003 | Hannan | H01Q 13/10 | 343/705 |
| 9,112,258 | B1 * | 8/2015 | Church | H01Q 7/005 | |
| 9,806,420 | B2 | 10/2017 | Church et al. | | |
| 9,960,484 | B2 * | 5/2018 | Chieh | H01Q 5/35 | |
| 10,141,647 | B2 * | 11/2018 | Rockway | H01Q 3/22 | |

(Continued)

*Primary Examiner* — Jason M Crawford

(74) *Attorney, Agent, or Firm* — Naval Information Warfare Center Pacific; Kyle Eppele

(57) ABSTRACT

A tunable or dual-band antenna includes a ground plane, top plane, a cage structure, first and second half-loops, and a hybrid phase shifter. The cage structure is attached to the ground plane and the top plane that includes four leg structures in electrically-conductive contact with the top plane. The top plane is one of a cross-element with four equilateral elements, a cross-element with eight equilateral elements, or a disc element. The first and second half-loops are independent from each other, located diagonally to each other within the cage structure, and support transmitting and receiving an electromagnetic field orthogonal to each other. The hybrid phase shifter shifts a frequency of the first and second half-loops to 90° from each other. The ground plane has an inner ground plane with two or more capacitors embedded therein.

20 Claims, 8 Drawing Sheets

(56) References Cited

U.S. PATENT DOCUMENTS

| | | | | | |
|---|---|---|---|---|---|
| 10,283,851 | B2 * | 5/2019 | Church | H01Q 5/25 | |
| 12,199,356 | B2 * | 1/2025 | Verd | H01Q 1/288 | |
| 2010/0073239 | A1 * | 3/2010 | Tatarnikov | H01Q 21/205 | 343/700 MS |
| 2012/0050120 | A1 * | 3/2012 | Lindenmeier | H01Q 1/3275 | 343/732 |
| 2015/0318607 | A1 * | 11/2015 | Chieh | H01Q 21/24 | 343/749 |
| 2019/0089040 | A1 * | 3/2019 | Church | H01Q 1/288 | |
| 2024/0380111 | A1 * | 11/2024 | Verd | H01Q 7/00 | |

* cited by examiner

TUNABLE ANTENNA

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; NIWC_Pacific_T2@us.navy.mil. Reference Navy Case Number 212390.

BACKGROUND

Dual-band antennas send and receive signals in two separate distinct bands while a broadband antenna sends and receives signals over a wide range of frequencies. Dual and broadband antennas can typically either operate at different frequencies sequentially or simultaneously depending on the application. The advantage of dual and broadband antennas is that these antennas reduce the footprint of the antenna when compared to multiple single band antennas. As a result, dual and broadband antennas can be used in space-limited applications. One example includes cellular or dual-band wireless access points. In addition, dual and broadband devices can be inexpensive making them useful for a wide range of applications.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

A nanosatellite are satellites that are equal to or less than 10 kg in mass. A CubeSat is an example of a nanosatellite that has a size of 1.33 kg and dimensions of 10 cm×10 cm×10 cm. Nanosatellites have limited space for antennas due to their size. As a result, nanosatellites have extremely limited space for antennas in general. Currently, multiple antennas are used in nanosatellites to support the required frequency bands to transmit and receive signals. Consolidating the antennas to a single antenna that can support dual or broadband frequencies on a nanosatellite has not been accomplished.

The tunable antenna herein can be incorporated onto a nanosatellite as a single antenna that supports a dual-band frequency or broadband frequency. The tunable antenna includes a broad frequency spectrum that allows the antenna to transmit and receive any necessary signal. As a result, this antenna saves space, weight, and money by reducing the number of antennas that can be used towards other functions of the satellite.

The antenna herein is a tunable or dual-band antenna includes a ground plane, a top plane, a cage structure, a first half-loop, a second-half loop, and a hybrid phase shifter. The ground plane is composed of a metallic material of a satellite structure or a base of a ground station antenna. The cage structure is attached to the ground plane and a top plane. The cage structure includes four leg structures in electrically-conductive contact with the top plane. The top plane is one of a cross-element with four equilateral elements, a cross-element with eight equilateral elements, or a disc element. The first and second half-loops are independent from each other, located diagonally to each other within the cage structure, and support transmitting and receiving an electromagnetic field orthogonal to each other. The hybrid phase shifter shifts a frequency of the first and second half-loops to 90° from each other. The ground plane has an inner ground plane with two or more capacitors embedded therein.

Figure 1:
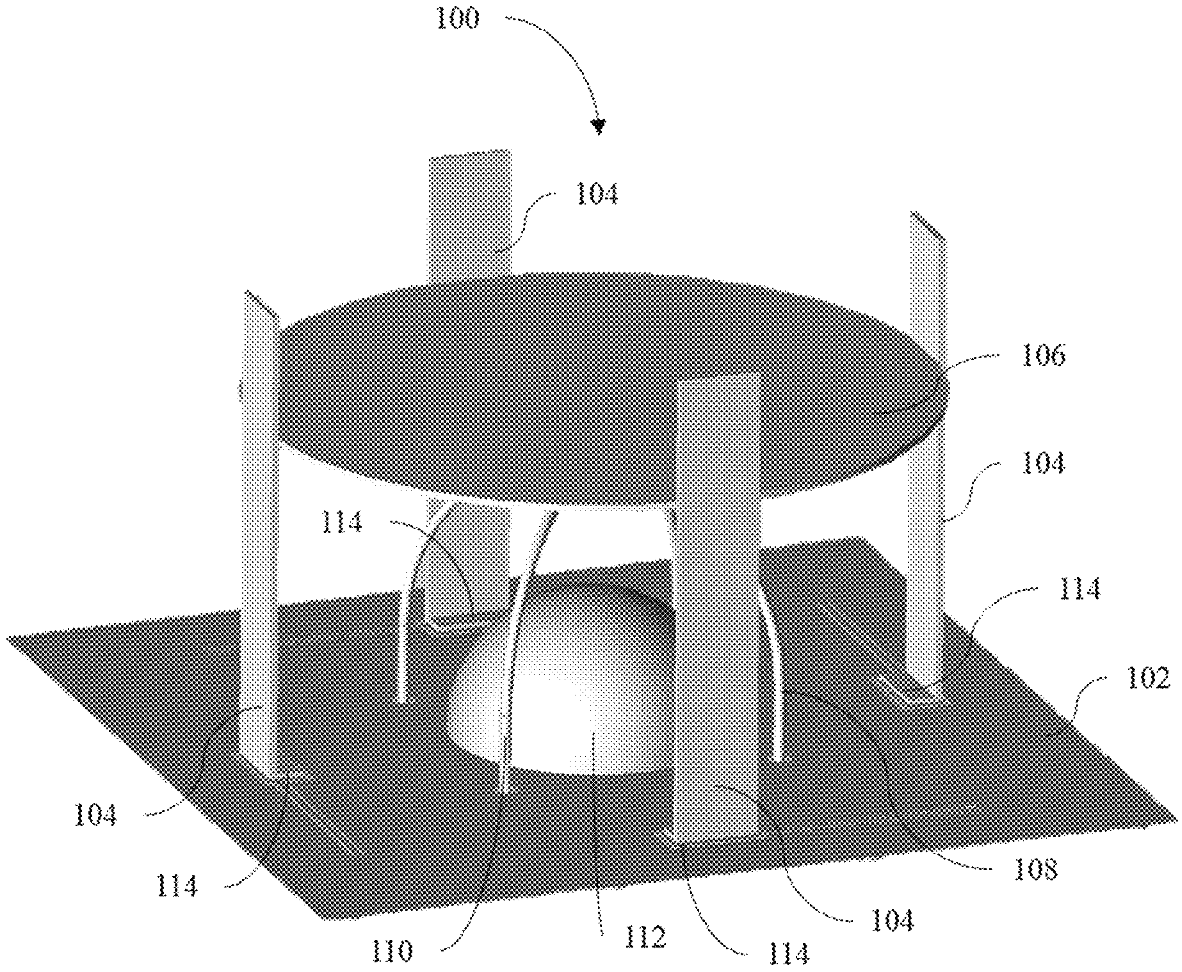
FIG. 1 is a perspective view of an example of a dual-band or broadband antenna without the top plane.
Figure 2:
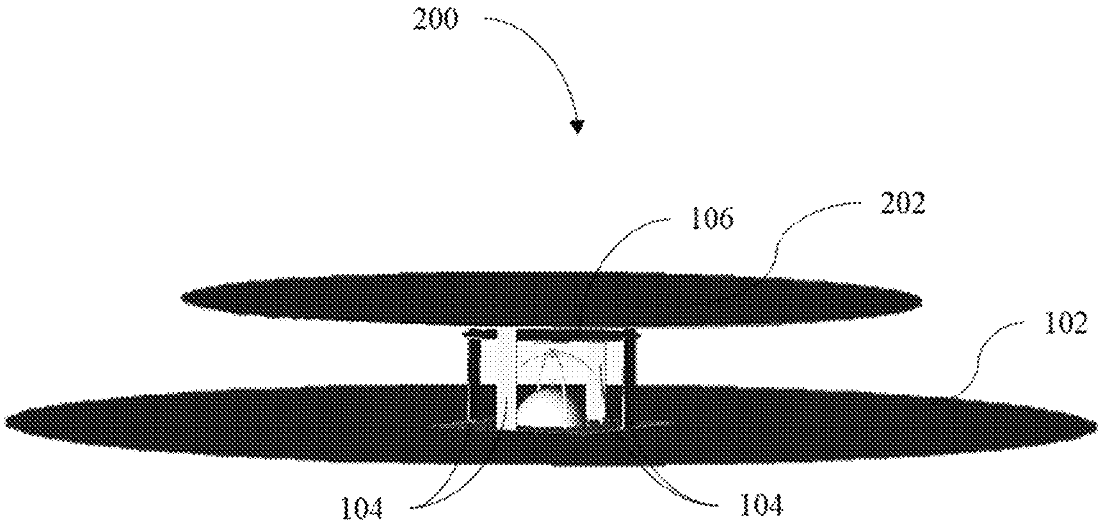
FIG. 2 is another perspective view of an example of a dual-band or broadband antenna with the top plane and ground plane.

Referring now to FIG. 1 and FIG. 2, a perspective view of an example of the tunable or dual-band antenna 100 is shown. In FIG. 1 and FIG. 2, any shading is for illustrative purposes only to aid in viewing and should not be construed as being limiting or directed to a particular material or materials. FIG. 1 shows an example of the tunable or dual-band antenna 100 without a top plane. In FIG. 1, only a portion of the ground plane 102 is shown, which is the inner ground plane. In FIG. 2, an example of the tunable or dual-band antenna 100 includes a ground plane 102, leg structures 104, a loop matching capacitor 106, a first half-loop 108, a second half-loop 110, a half-dome 112, capacitors 114, and a top plane 202. In other examples, the tunable or dual-band antenna 100 may include a ground plane 102, leg structures 104, a first half-loop 108, a second half-loop 110, capacitors 114, and a top plane 202. The ground plane 102 performs the function of reflecting the signal from the other components of the dual-band or tunable antenna 100 and the bottom resonance of the cavity. The ground plane 102 may be any metallic material. An example includes copper. The ground plane 102 can be any shape, such as a circular shape, a square shape, or a rectangular shape. In some examples, the ground plane 102 is a satellite structure (e.g., a nanosatellite) or a base of a ground station antenna.

The tunable or dual-band antenna 100 also includes a cage structure. The cage structure functions as the cavity resonator. In one example shown in FIG. 1 and FIG. 2, the cage structure is attached to the top plane 202 with four leg structures 104 in electrically-conductive contact with the top plane 202. In another example, the cage structure is attached to the top plane 202 and a loop matching capacitor 106 as shown in FIG. 2. The cage structure includes four leg structures 104 in electrically-conductive contact with the loop matching capacitor 106 and a top plane 202 (shown in FIG. 2).

Figure 3:
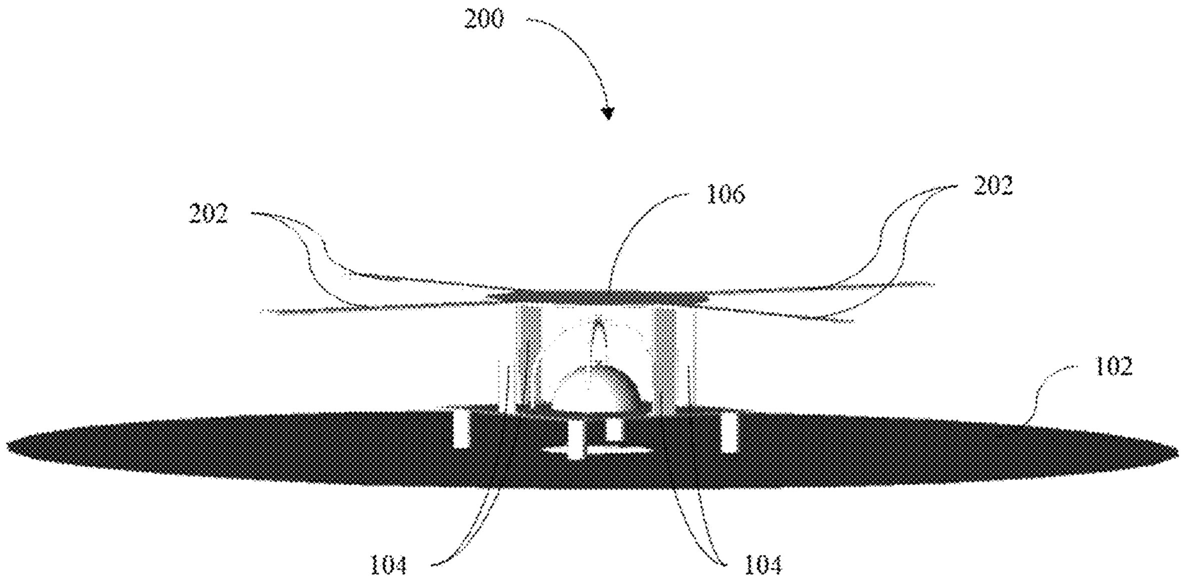
FIG. 3 is another perspective view of an example of a dual-band or broadband antenna with a cross-element top plane with four equilateral elements.
Figure 4:
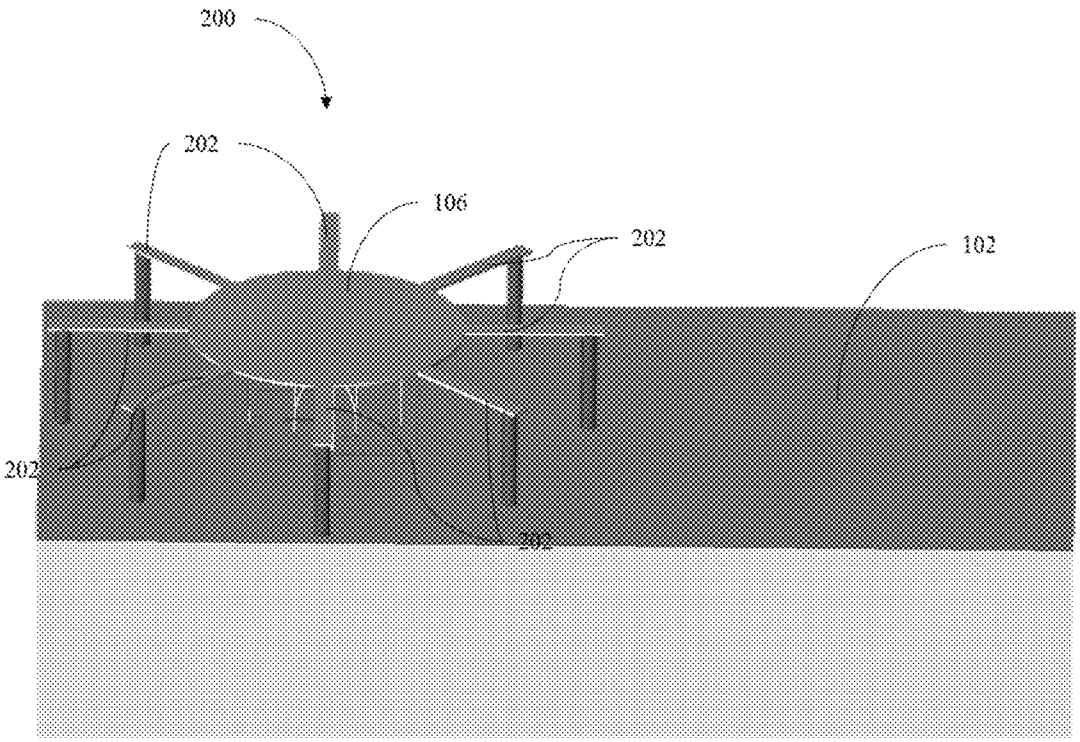
FIG. 4 is another perspective view of an example of a dual-band or broadband antenna with a cross-element top plane with eight equilateral elements.

An example of the tunable or dual-band antenna with the top plane and ground plane 200 is shown in FIG. 2. In FIG. 2, the top plane 202 is shown as a disc element. The top plane 202 supports the resonant cavity (i.e., the cage structure) and helps direct the energy upward. The size relationship of the top plane 202 and the ground plane 102 work in conjunction to propagate the electromagnetic field upward. The ground plane 102 acts as the base and the top plane 202 acts like a director. The top plane 202 may be any shape that allows the tunable antenna 200 to function for the desired application. Some other examples of the top plane 202 include a cross-element with four equilateral elements or a cross-element with four equilateral elements. FIG. 3 shows another example where the top plane 202 is a cross element with four equilateral elements that extend from the loop matching capacitor 106. FIG. 4 shows yet another example where the top plane 202 is a cross element with eight equilateral elements that extend from the loop matching capacitor 106. In FIG. 4, the antenna 200 is positioned on the base of a satellite structure as a ground plane 102.

The size of the cage structure and top plane 202 may vary depending on the application. In an example, the cage structure may have any height as long as the height is about 1:6 the top plane 202 diameter. In an example, the width of the cage structure may be any width as long as the width is about 1:4 the top plane 202 diameter. In an example, the top plane 202 may have a diameter of about 2:3 the ground plane 102 diameter when the top plane 202 and the ground plane 102 are circular. In another example, the top plane 202 may have a size of about 2:3 the ground plane 102 when the top plane 202 and the ground plane 102 are rectangular.

The leg structures 104, the loop matching capacitor 106, and the top plane 202 may be a metallic material. In an example, the leg structures 104, the loop matching capacitor 106, the top plane 202, and ground plane 102 may all be the same metallic material. In another example, the leg structures 104, the loop matching capacitor 106, the top plane 202, and ground plane 102 may all be different metallic materials. In yet another example, two or more of the leg structures 104, the loop matching capacitor 106, the top plane 202, and the ground plane 102 may be the same or different metallic material depending on the application.

Referring back to FIG. 1, the dual-band or tunable antenna 100 includes a first half-loop 108 and a second half-loop 110. The first half-loop 108 and the second half-loop 110 are independent from each other, located diagonally to each other within the cage structure, and support transmitting and receiving an electromagnetic field orthogonal to each other. Each of the first half-loop 108 and the second half-loop 110 is phased 90° from each other to produce a circularly polarized electromagnetic wave, which can be transmitted or received. Due to the nature of circularly polarized waves, the quality of the circular polarization changes with angle off center. The axial ratio of the dual-band or broadband antenna 100 herein may be equal to or less than 3 dB at +/−45° from center.

Figure 5:
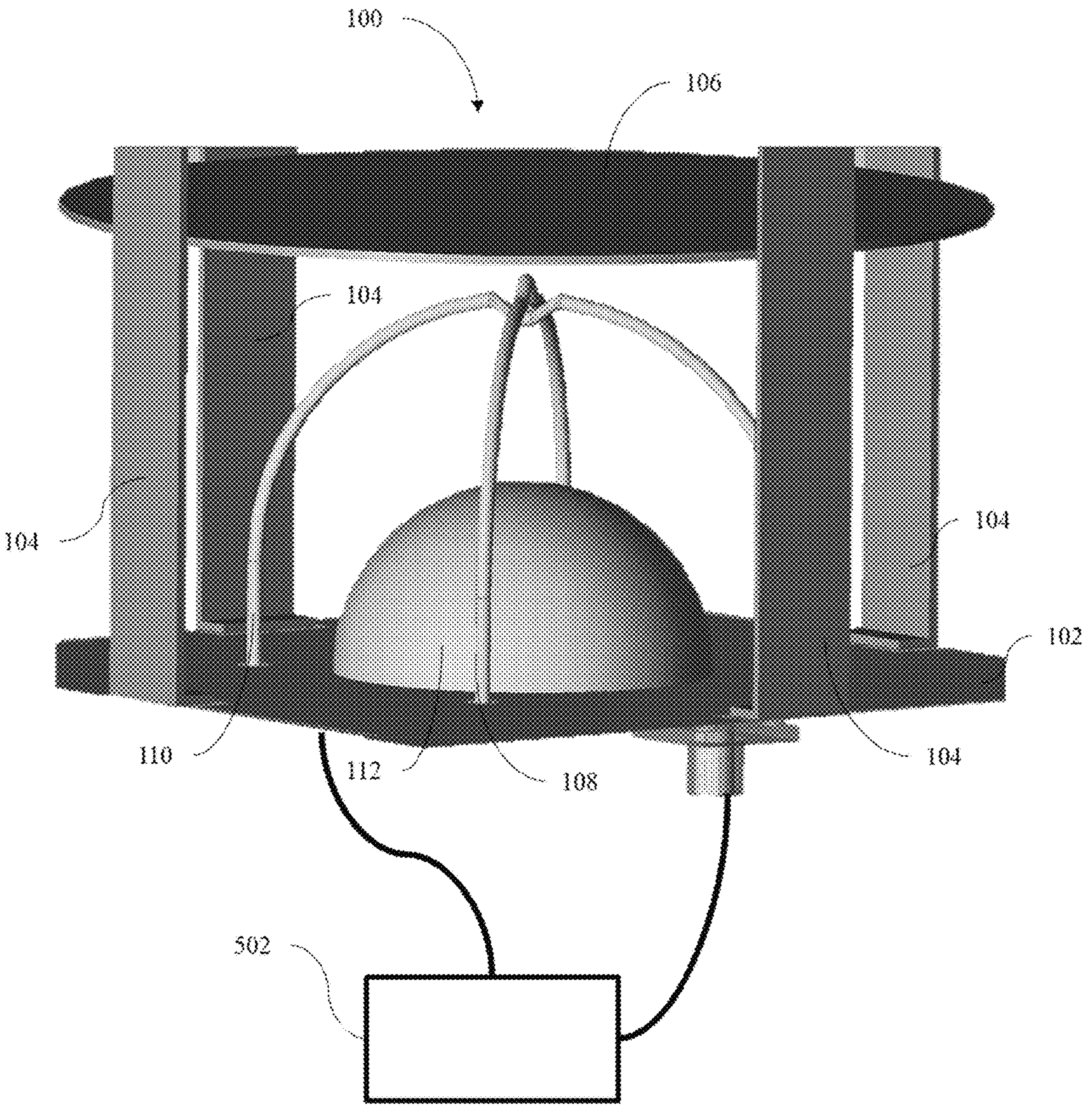
FIG. 5 is another perspective view of an example of a dual-band or broadband antenna without the top plane.

FIG. 5 shows an enlarged perspective view of the dual-band or broadband antenna 100 without the top plane 202 and a portion of the ground plane 102 with only the inner ground plane showing. In FIG. 5, any shading is for illustrative purposes only to aid in viewing and should not be construed as being limiting or directed to a particular material or materials. In FIG. 5, the first half-loop 108 and second half-loop 110 are clearly shown to be independent and distinct. At the peak of each half-loop 108, 110, the first half-loop 108 bends above the second-half-loop 110 to ensure the half-loops remain separate and distinct without touching. The first half-loop 108 and the second half-loop 110 have a size of about 1:2 of the cage structure width. The first-half loop 108 and the second half-loop 110 may be a metallic material. In an example, the leg structures 104, the loop matching capacitor 106, the top plane 202, ground plane 102, the first-half loop 108, and the second half-loop 110 may all be the same metallic material. In another example, the leg structures 104, the loop matching capacitor 106, the top plane 202, ground plane 102, the first-half loop 108, and the second half-loop 110 may all be different metallic materials. In yet another example, two or more of the leg structures 104, the loop matching capacitor 106, the top plane 202, ground plane 102 the first-half loop 108, and the second half-loop 110 may be the same or different metallic material depending on the application.

Referring back to FIG. 1, in some examples, the dual-band or tunable antenna 100 includes the loop-matching capacitor 106. The loop matching capacitor 106 enhances the resonant frequency response of the first and second half-loops 108, 110 in air. In other examples, the dual-band or tunable antenna 100 does not include the loop-matching capacitor 106. In instances where a loop-matching capacitor 106 is not included, the top plane 202 performs the function of the loop-matching capacitor 106 by moving the top plane 202 closer to the ground plane 102 to create the same matching impedance as the loop matching capacitor 106 when the loop matching capacitor 106 is present. When the loop-matching capacitor 106 is used, the cage structure is attached to the top plane 202 and a loop matching capacitor 106 as shown in FIG. 2.

Referring back to FIG. 1, in some examples, the dual-band or tunable antenna 100 includes an electrically-conductive half-dome 112. In other examples, the dual-band or tunable antenna 100 does not include an electrically-conductive half-dome 112. The half-dome 112 is centered on the ground plane 102 in a middle of the cage structure and within the first half-loop 108 and second half-loops 110. In examples when the half-dome 112 is used, the half-dome 112 improves the axial ratio and circular polarization performance at broader angles. Similar to the other components, the half-dome 112 may be a metallic material. In some examples, the half-dome 112 may be the same or different metallic material as all the other components. In another example, the half-dome 112 may be the same metallic material as one or more of the components, but not all of them.

Referring to FIG. 5, in order to produce a circular electromagnetic field, the dual-band or broadband antenna 100 includes a hybrid phase shifter 502 connected to two inputs (not shown) to create circular polarization. In an example, the hybrid phase shifter 502 is set to 90° to create circular polarization created by the first and second half-loops 108, 110. The hybrid phase shifter 502 feeds the first and second half-loops 108, 110 90° in frequency phase from each other, which creates spinning. Any hybrid phase shifter 502 that is able to set the first and second half-loops 108, 110 to a 90° phase shift can be used. For example, a 0° and 90° hybrid phase shifter may be used.

Figure 6:
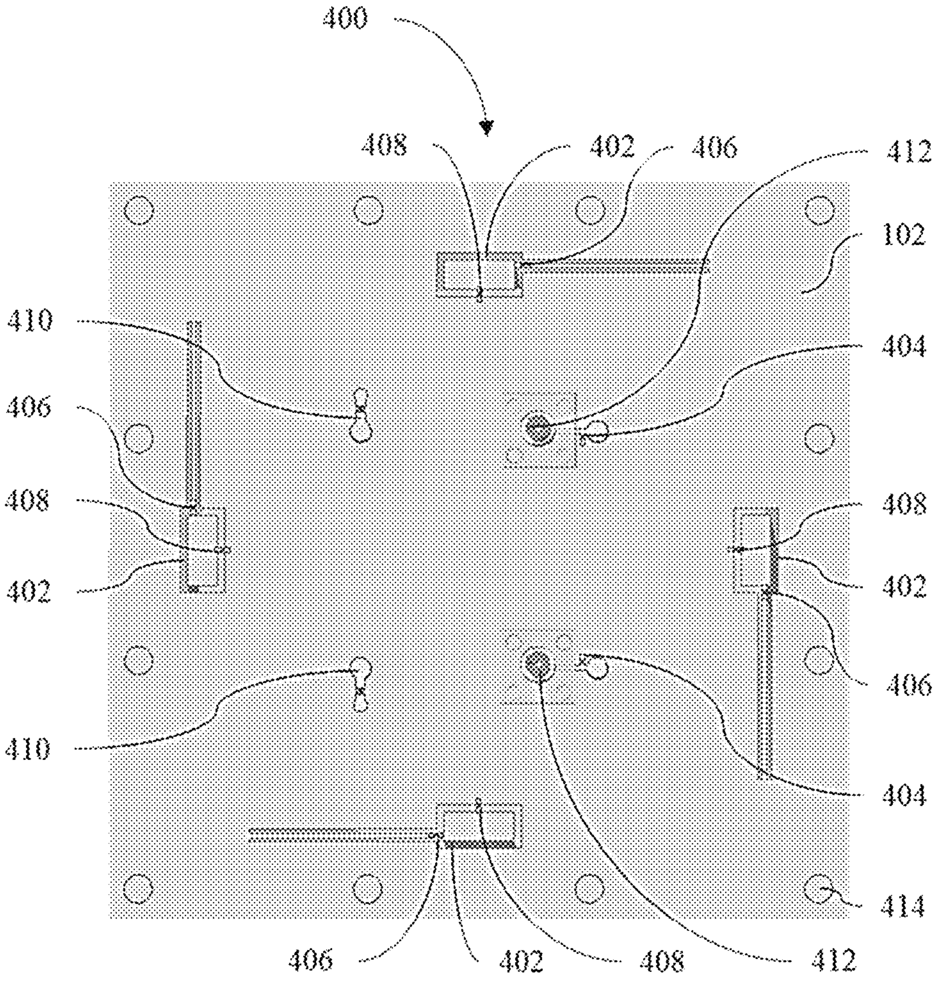
FIG. 6 is a bottom 2D view of an example of the inner ground plane of the dual-band or broadband antenna.

Referring now to FIG. 6, a bottom 2D view 400 of an example of a portion of the ground plane 102 showing the inner ground plane of the dual-band or broadband antenna 100 is shown. The inner ground plane 102 has two or more capacitors embedded therein. In the example shown in FIG. 6, includes 12 capacitors on the ground plane 102 including 2 input capacitors 404, 4 edge capacitors 406, 4 antenna capacitors 408, and 2 loop capacitors 410. The number of capacitors is not limited to the example in FIG. 6. The number of capacitors is dependent on the application of the dual or broadband antenna 100. In one example, the two or more capacitors together have a capacitor value that supports one broadband frequency ranging from $F_1$ to $F_4$ to create a broadband antenna. In another example, the two or more capacitors together have a capacitor value that supports two non-overlapping frequency bands, $F_1$ to $F_2$ and $F_3$ to $F_4$, to create a dual-band antenna. As a result, by changing the capacitor values allows the functionality of the antenna 100 to be modified between a dual-band antenna and a broadband antenna. In addition, the frequency spectrum can be modified to best fit a specific application by modifying the capacitor values to support a specific broadband frequency or two distinct frequency bands.

In the example in FIG. 6, the ground plane 102 also includes antenna leg structure connection pads 402, SMA connectors 412, and screws 414. The antenna leg structure connection pads 402 connect the leg structures 104 to the printed circuit board (not depicted in FIG. 6). The SMA connectors 412 are offset from the first and second half-loops 108, 110 and electrically connect the first and second half-loops 108, 110 to the two respective input capacitors 404. In the example in FIG. 6, the screws 414 are all around the edge of the ground plane 102 to secure the ground plane 102 to whatever service is being used. For example, the screws 414 can secure the ground plane 102, and therefore the dual-band or broadband antenna 100, to a satellite structure or a base of a ground station antenna when the satellite structure or base of a ground station antenna is not functioning as the ground plane 102. In addition, the method of securing the ground plane 102 is not limited to screws 414, but any means of attachment may be used that allows the antenna to function.

To further illustrate the present disclosure, examples are given herein. These examples are provided for illustrative purposes and are not to be construed as limiting the scope of the present disclosure.

EXAMPLES

Figure 7:
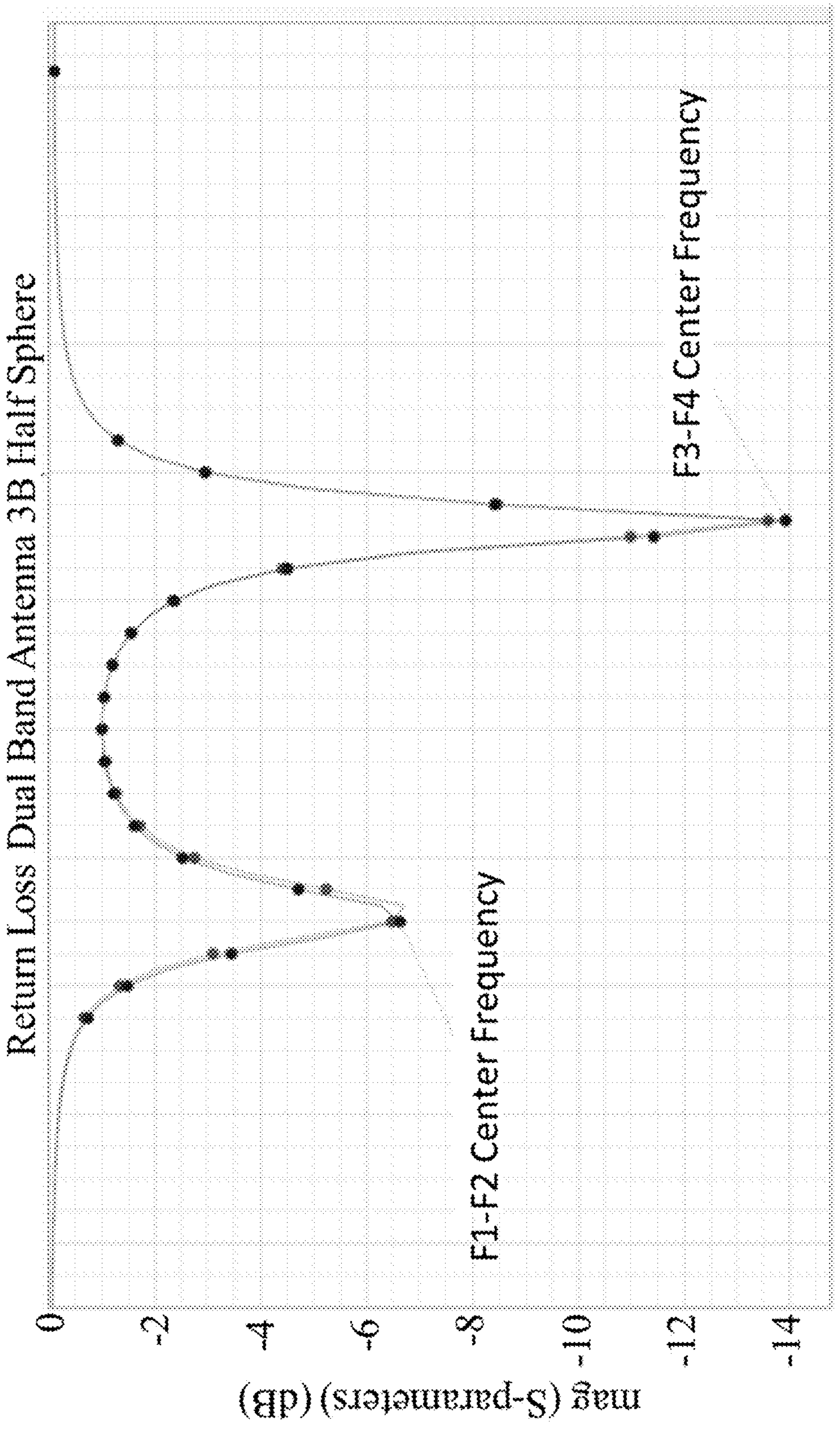
FIG. 7 is a plot of the return loss (X-axis labeled "Return Loss Dual Band Antenna 3B Half Sphere) vs. the frequency (Y-axis labeled "mag(S-parameters) (dB)") of an example of a dual-band antenna disclosed herein.

An example of a dual-band antenna was tested via a simulation. The dual-band antenna included a half-sphere in the center of the ground plane. The capacitors were prepared and added to the dual-band antenna to create two separate frequency ranges. Return loss measurements were taken one half-loop at a time while the other half-loop was terminated with 50 ohms. The results are shown in FIG. 7 as the return loss of the loop matching capacitors.

Figure 8:
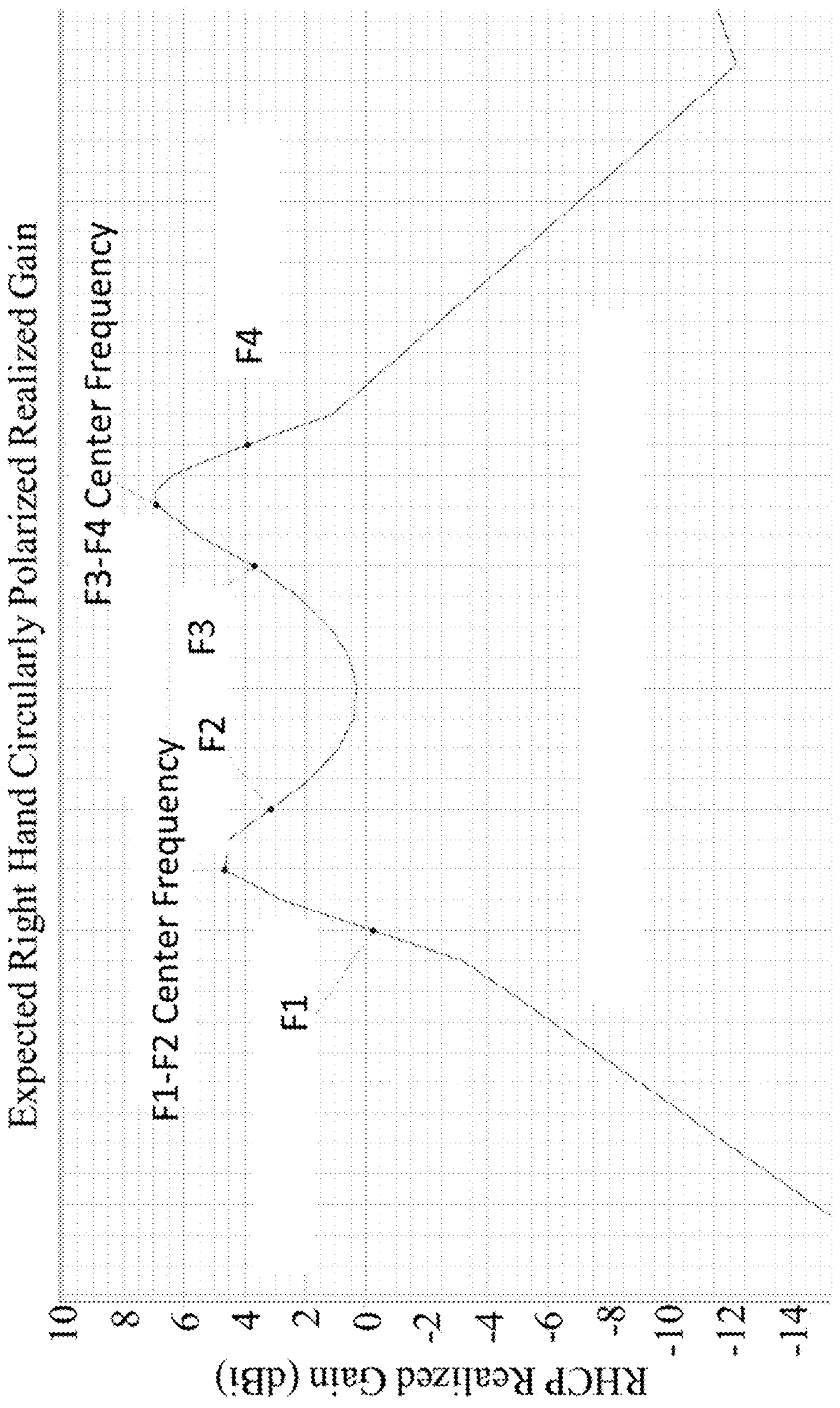
FIG. 8 is a plot of the frequency (X-axis labeled "Field-StorageFrequency (GHz))" vs. realized gain (Y-axis labeled "RHCP Realized Gain (dBi)) of an example of a dual-band antenna disclosed herein.

The dual-band antenna was then taken to an antenna chamber for antenna pattern, gain, and axial ratio measurements. A known linear source was used to calibrate the antenna chamber for any cable or space losses between the source antenna and the dual-band antenna being tested. Measurements were taken with a source horn at 0°, −45°, +45°, and 90° to calculate the axial ratio. The delta between the minimum and maximum gain was used as the measured axial ratio. The realized gain was estimated using a circular polarization to linear conversion chart and maximum gain. The circular polarization was created using a 90° phase splitter connected to each half-loop. The results are shown in FIG. 8 as right hand circularly polarized realized gain vs. the frequency.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 0.1 to about 20 should be interpreted to include not only the explicitly recited limits of from about 0.1 to about 20, but also to include individual values, such as 3, 7, 13.5, etc., and sub-ranges, such as from about 5 to about 15, etc.

In describing and claiming the examples disclosed herein, the singular forms "a", "an", and "the" include plural referents unless the context clearly dictates otherwise.

What is claimed is:

1. A tunable broadband antenna, comprising:

a ground plane, wherein the ground plane is a metallic material of a satellite structure or a base of a ground station antenna;

a cage structure attached to the ground plane and a top plane, wherein the cage structure includes four leg structures in electrically-conductive contact with the top plane where the top plane is a cross-element with eight equilateral elements;

a first half-loop and a second half-loop, wherein the first and second half-loops are independent from each other, located diagonally to each other within the cage structure, and support transmitting and receiving an electromagnetic field orthogonal to each other; and a hybrid phase shifter, wherein the hybrid phase shifter shifts a frequency of the first and second half-loops to 90° from each other;

wherein the ground plane has an inner ground plane with two or more capacitors embedded therein.

2. The tunable antenna of claim 1, further including a loop matching capacitor, wherein the cage structure is attached to the ground plane and the loop matching capacitor.

3. The tunable antenna of claim 1, wherein the cage structure has a height of about 1:6 of a top plane diameter.

4. The tunable antenna of claim 1, wherein the top plane has a size of about 2:3 of the ground plane when the top plane and the ground plane are rectangular or the top plane has a diameter of about 2:3 of the ground plane diameter when the ground plane and top plane are circular.

5. The tunable antenna of claim 1, wherein the cage structure has a cage width of about 1:4 of a top plane diameter.

6. The tunable antenna of claim 1, further including an electrically conductive half-dome, wherein the electrically conductive half-dome is centered on the ground plane in a middle of the cage structure and within the first and second half-loops.

7. The tunable antenna of claim 1, wherein the first and second half-loops are a size of about 1:2 of a cage structure width.

8. The tunable antenna of claim 1, wherein the two or more capacitors have a capacitor value that supports a broadband frequency ranging from $F_1$ to $F_4$.

9. The tunable antenna of claim 1, wherein the inner ground plane includes 12 capacitors that are 4 antenna capacitors, 4 edge capacitors, 2 loop capacitors, and 2 input capacitors.

10. The tunable antenna of claim 1, wherein the tunable broadband antenna has an axial ratio of equal to or less than 3 dB at +/−45 degrees from a center of the tunable broadband antenna.

11. A dual-band antenna, comprising:

a ground plane, wherein the ground plane is a metallic material of a satellite structure or a base of a ground station antenna;

a cage structure attached to the ground plane and a top plane, wherein the cage structure includes four leg structures in electrically-conductive contact with the top plane where the top plane is a cross-element with eight equilateral elements a first half-loop and a second half-loop, wherein the first and second half-loops are independent from each other, located diagonally to each other within the cage structure, and support transmitting and receiving an electromagnetic field orthogonal to each other; and a hybrid phase shifter, wherein the hybrid phase shifter shifts a frequency of the first and second half-loops to 90° from each other;

wherein the ground plane has an inner ground plane with two or more capacitors embedded therein.

12. The dual-band antenna of claim 11, further including a loop matching capacitor, wherein the cage structure is attached to the ground plane and the loop matching capacitor.

13. The dual-band antenna of claim 11, wherein the cage structure has a height of about 1:6 of a top plane diameter.

14. The dual-band antenna of claim 11, wherein the top plane has a size of about 2:3 of the ground plane when the top plane and the ground plane are rectangular or the top plane has a diameter of about 2:3 of the ground plane diameter when the ground plane and top plane are circular.

15. The dual-band antenna of claim 11, wherein the cage structure has a cage width of about 1:4 of a top plane diameter.

16. The dual-band antenna of claim 11, further including an electrically conductive half-dome, wherein the electrically conductive half-dome is centered on the ground plane in a middle of the cage structure and within the first and second half-loops.

17. The dual-band antenna of claim 11, wherein the first and second half-loops are a size of about 1:2 of a cage structure width.

18. The dual-band antenna of claim 11, wherein the two or more capacitors have a capacitor value that supports two non-overlapping frequency bands $F_1$ to $F_2$ and $F_3$ to $F_4$.

19. The dual-band antenna of claim 11, wherein the inner ground plane includes 12 capacitors that are 4 antenna caps, 4 edge caps, 2 loop caps, and 2 input caps.

20. The dual-band antenna of claim 11, wherein tunable broadband antenna has an axial ratio of equal to or less than 3 dB at +/−45 degrees from a center of the tunable broadband antenna.

* * * * *